United States Patent Office 3,557,042
Patented Jan. 19, 1971

3,557,042
CHEMICAL THICKENING AGENT FOR
UNSATURATED POLYESTER RESINS
Albert J. Dalhuisen, San Jose, Calif., assignor to Merck & Co., Inc., Rahway, N.J., a corporation of New Jersey
No Drawing. Filed Oct. 30, 1967, Ser. No. 679,249
Int. Cl. C08f 45/02
U.S. Cl. 260—31.2
2 Claims

ABSTRACT OF THE DISCLOSURE

Unsaturated polyester resins containing selected anhydrous monobasic carboxylic acid metal salts as chemical thickening agents.

---

This invention concerns a novel polyester resin system containing an unsaturated polyester resin and anhydrous salts and a process for preparing said noval polyester resin system. More particularly this invention concerns mixtures of unsaturated polyesters and polymerizable monomers containing $>C=CH_2$ groups which undergo a rapid increase in viscosity at ambient temperature and a method for preparing this resin system.

Compositions containing unsaturated polymerizable monomers and unsaturated alkyd resins of dihydric alcohols and unsaturated dicarboxylic acids are commonly referred to as "unsaturated polyester resins" and are known to be capable of catalytically polymerizing to insoluble and infusible copolymers. Polyester resins find use in the preparation of various articles of manufacture such as appliances, boats, automotive parts, and devices for electrical equipment. During the preparation of such articles, it has been found desirable to impart additional physical properties to the polyester resin used so as to permit efficient and technically superior production techniques. The use of an unsaturated polyester-anhydrous salt composition which rapidly increases in viscosity is an important factor in permitting the desired production techniques. The more rapid increase of viscosity permits the resulting thickened polyester to be used sooner after mixing and thereby reduces the amount of material held in inventory; this affords production economies.

In order to provide thickened polyester resins, the art have employed additives, such as silica aerogel. However, this additive is well known to settle and to cause drifting of the gelling and curing characteristics, as well as decreasing the resin stability. On the other hand, organic thickening agents are well known to require complicated blending equipment and their use, even with substantial blending, falls far short of the desired goal. Heretofore, remedial efforts, both process and compositionwise, have failed to uncover a satisfactory non-draining, high viscosity product when containing, as a major component, unsaturated polyesters. It is an aspect of this invention to provide an anhydrous salt such that its addition to an unsaturated polyester resin causes a surprisingly rapid viscosity increase in the composition obtained. A further object is a method of making a polyester composition having improved properties. It is another object of this invention to provide an improved polyester composition containing an anhydrous salt to insure a surprisingly beneficial viscosity-time relationship. Other objects will become apparent from the following description of the invention.

The anhydrous salts that have been found to impart desirable physical properties to unsaturated polyester resins are the monobasic carboxylic acid salts of metals of Group II. Examples of representative members of the Group II metals that may be employed in the present invention are barium, calcium and zinc. Although, the acids from which the salts are formed should be monobasic, they may otherwise be saturated or unsaturated, aliphatic or aromatic having at least 2 carbon atoms, the range of 2–12 carbon atoms being particularly preferred. Examples of anhydrous salts that may be employed are calcium propionate, calcium salicylate, calcium benzoate, calcium laurate, barium acetate, zinc propionate and zinc salicylate.

The amount of anhydrous salt employed shall usually vary within the range of 10–100 mmole of anhydrous salt per hundred parts of resin, the preferred amounts of anhydrous salt having been found to lie in the region of 50–75 mmole per hundred parts of resin. However, it should be noted that the proportions of ingredients employed are in no way a critical aspect of this invention and other values may be used depending on the thickening desired in a particular resin system.

Hitherto, attempts to increase the viscosity of unsaturated polyester resins by employing salts of carboxylic acids and a metal selected from Group II of the periodic charts have proved unsuccessful. U.S. Pat. 3,124,549 reports that magnesium naphthenate and calcium naphthenate demonstrate virtually no tendency to thicken unsaturated polyester resins. The patent states that the metal salt produces thickening only when the unsaturated polyester resin contains polymeric fatty acids. The present invention is based upon the discovery that, not withstanding the prior art observations, the addition of a certain class of anhydrous metal salts to an unsaturated resin system broadly, not merely those which contain polymeric fatty acids, results in an unexpected highly desirable rapid increase in viscosity.

In accordance with this invention, the anhydrous salts described above are blended with the polyester resin. The resulting material, a thickened polyester resin, has desirable physical characteristics, particularly the ability to attain high viscosity in a relatively short time. For instance, many of the thickened polyester resins of the present invention attain a certain viscosity at room temperature in about 20 hours, whereas otherwise identical thickened polyesters containing other well-known thickening agents may require about 5 days to attain this same viscosity.

It is well known that the thickening of polyester resins can be accomplished by the addition of powdered fillers in considerable bulk. However, the use of bulk fillers results in resins which are opaque and, accordingly, greatly limited in application. In contrast, by the addition of relatively small amounts of the anhydrous salt preparation, it is possible to achieve the highly desirable increase in viscosity without suffering loss in clarity. The resins that are produced as a result of the present invention are clear and transparent after polymerization. Where clarity is not a requirement, the resin compositions of this invention may also contain fillers such as are normally used in the art for making articles prepared from polyesters. Such fillers include barytes, ground silica, magnesium carbonate, diatomaceous earth, glass fiber, hydrated alumina, and the like. The novel compositions of matter which are here called thickened polyesters are particularly useful in the preparation of objects and articles of manufacture where low tackiness and smooth finishes are desired.

The anhydrous salt is conveniently incorporated into polyester resin by admixing it vigorously with the polyester; no special equipment or methods are required to dispense the salts. A high-speed, high-shear mixer may be employed to blend the formulation. The salts may also be admixed with a vehicle to form a dispersion. A Cowels Dissolver is useful in preparing such dispersions. A dry form of the salt may also be added to the polyester. The salt is readily admixed with the polyester using a laboratory stirrer operating at about 4–6,000 revolutions per minute. The entire mixing procedure may take place at room temperature.

The polyester starting materials employed in this invention are polymerizable resin compositions derived from the product obtained by dissolving a precondensed linear polymer in a monomeric polymerizable compound containing an ethylenic bond and capable of cross-linking the linear polymer into a rigid three-dimensional gel. The linear polymer is a polymeric ester produced by the recurring condensation of a dicarboxylic acid (aromatic or ethylenic) with a polyol.

The polyols used as reactants for this esterification reaction include saturated and unsaturated aliphatic glycols, such as ethylene glycol, 1,2-propylene glycol, 1,3-propylene glycol, 1,2-butylene glycol, 1,4-butylene glycol, 1,5-pentane diol, the hexylene glycols, neopentyl glycol, 2-butene-1,4-diol, etc. They also include dihydroxy polyethers, such as diethylene glycol, dipropylene glycol, triethylene glycol, and also the higher polyglycols of waxy consistency. Also, cycloaliphatic diols, such as 2,2-isopropylidene dicyclohexanol (hydrogenated Bisphenol A) are utilized.

The alpha, beta, ethylenically unsaturated dicarboxylic acids employed in obtaining the unsaturated polyesters include maleic acid, fumaric acid, aconitic acid, itaconic acid, mono chloromaleic acid, etc., and the corresponding anhydrides of the cis-acids. These ethylenically unsaturated dicarboxylic acids may be partially replaced with either saturated dicarboxylic acids or with dicarboxylic acids which contain only benzenoid unsaturation. This group includes adipic acid, azelaic acid, ortho phthalic acid, isophthalic acid, terephthalic acid, tetrahydrophthalic acid, hexahydrophthalic acid, etc., as well as the anhydrides of those acids which are capable of forming anhydrides. Resins suitable for use in this invention should contain reactive carboxylic acid groups.

The monomeric polymerizable compound used for cross-linking contains an ethylenic grouping, preferably attached to a phenyl group as in styrene, alpha-methyl styrene or divinyl benzene. Other polymerizable monomers that may be employed are vinyl toluene, diallyl phthalate, triallyl cyanurate, triallyl isocyanurate, triallyl citrate, diallyl maleate, diallyl fumarate, the isomers of dichlorostyrene, etc. These monomers also include methyl methacrylate, ethyl methacrylate, methyl acrylate, ethyl acrylate, allyl methacrylate, ethylene dimethacrylate, cyclohexyl methacrylate, tetramethylene dimethacrylate, polyethylene dimethacrylate, etc. As examples of some of the resins within the above description there may be mentioned Stypol 40-2417 and Acpol 42-2666 (Freeman Chemical Company); Selectron RS 5003, Selectron 5156, Selectron 50012, Selectron RS 5119 (Pittsburgh Plate Glass Company); Plaskon 9520 (Allied Chemical Company); Polylite 8000 and Polylite 31-000 (Reichold Chemical Company), Vibrin 156R (U.S. Rubber Company), and Leguval W-21 (Farbenfabriken Bayer A.G.).

Stabilizers for the unsaturated polyester resins include compounds of phenolic and quinoid structure, such as hydroquinone, tertiary butyl catechol, quinone, etc. Other suitable stabilizers include quaternary ammonium salts, esters of phosphorous acid, copper salts, gaseous oxygen, etc., as is well known in the art.

The unsaturated polyester resins can be cured to insoluble and infusible copolymers by the use of suitable curing agents, such as peroxides and hydroperoxides, such as benzoyl peroxide, methyl ethyl ketone peroxide, cyclohexanone peroxide, lauroyl peroxide, tertiary butyl perbenzoate, diacetylperoxide, cumene hydroperoxide, etc., all of which are well known in the art.

When admixed with the anhydrous salts of the present invention, the above polyesters provide a composition having enhanced physical properties particularly beneficial in the production of various articles of manufacture. This composition is of sufficiently low viscosity shortly after preparation to completely wet a filler. Furthermore, the viscosity is of an order as to wet out a reinforcing material such as fiberglass. Thereafter, the novel composition becomes highly viscous, permitting easy handling, ready storage and convenient use of direct molding techniques. The obtaining of this highly viscous thickened polyester at an enhanced rate permits substantial savings of both time and expense during the preparation of the molded articles.

The reason for the surprising viscosity increase in the thickened polyester resin is not clearly understood. Although it is not desired to limit the invention to any particular theory, it is believed that the following phenomena occurs: The carboxylic acid groups of the polyester molecules split the anhydrous salts. The metallic cation then reacts with the polyester carboxylic acid groups. Since a polyester molecule may have more than one carboxylic acid group, different polyester molecules may in this manner be linked by metallic bridges, thus increasing the viscosity. The surprisingly strong acidity of the polyester carboxylic acid groups is thought to be due to $\alpha$-unsaturation of these groups. The solvation effect of the anionic part of the salt is also important as indicated by the fact that the benzoates and salicylates are very effective thickeners.

The following examples are given for the purpose of illustration and not by way of limitation:

EXAMPLE I

The unsaturated polyester resins employed in the following examples are as follows: Polylite 31-000 (Reichold); Leguval W-21 (Farbenfabriken Bayer); Acpol 42-2666 (Freeman Chemical). The unsaturated polyester resins formulations, both with and without the various salts are allowed to stand at ambient temperature and final viscosity measured at 25° C. using a Gardner Bubble Viscometer Series U to Z6 (a higher number or letter indicates a higher viscosity). The symbol NF in the table means that no flow was observed in a Gardner tube 30 minutes after turning the tube. All salts were anhydrous and were tested at the rate of 67 mmole per 100 parts of resin. The salt-resin formulations were prepared by adding the required amount of anhydrous salt to 20 gms. of polyester. This was mixed at room temperature with a propeller type laboratory stirrer. The following results were obtained.

The viscosity of the resins in the absence of the anhydrous salt thickening agent is as follows:

TABLE I

| Polyester: | Viscosity |
|---|---|
| Polylite 31-000 | U |
| Acpol 42-2666 | Z-2 |
| Leguval W-21 | V |

The following table reports the viscosity of the identical resins employed in Table I to which were added the anhydrous salts:

TABLE II

| Salt | Polyester | Viscosity |
|---|---|---|
| Zinc propionate | Leguval W-21 | >Z-6 |
| Do | Polylite 31-000 | >Z-6 |
| Do | Acpol 42-2666 | >Z-6 |
| Zinc salicylate | Leguval W-21 | >Z-6 |
| Do | Polylite 31-000 | >Z-6 |
| Do | Acpol 42-2666 | >Z-6 |
| Calcium propionate | Leguval W-21 | >Z-6 |
| Calcium salicylate | do | >Z-6 |
| Calcium benzoate | do | NF |
| Calcium laurate | Polylite 31-000 | NF |
| Do | Acpol 42-2666 | NF |
| Barium acetate | Leguval W-21 | >Z-6 |
| Do | Polylite 31-000 | NF |
| Do | Acpol 42-2666 | Z-5 |

The substantially greater viscosity displayed by the resin-anhydrous salt formulation is clearly evident when compared with the resins per se.

EXAMPLE II

This example demonstrates the difference in thickening that may be obtained according to the particular resin system employed. The various resins were thickened using 67 mmole of calcium propionate per hundred parts of resin. The viscosity was determined according to the procedure set forth in Example I.

TABLE III

| Thickened polyester | Gardner viscosity after— | | | | |
|---|---|---|---|---|---|
| | 2 hrs. | 4 hrs. | 10 hrs. | 3 days | 8 days |
| Polylite 31-000 | Y | Y | Z | X | Z-6 |
| Leguval W-21 | Z-6 | >Z-6 | >Z-6 | >Z-6 | >Z-6 |

From a consideration of Examples I and II one can readily appreciate one of the significant advantages of this invention; namely, providing the art with an opportunity to select a suitable salt and a suitable resin in order to achieve the desired viscosity increase in a suitable time as required by ultimate product use and application techniques.

Although this invention has been described with reference to particular embodiments thereof, it is to be understood that the invention is susceptible to other modifications which appear within the spirit of the invention and the scope of the appended claims.

What is claimed is:

1. A resin composition of improved physical properties comprising a polymerizable blend consisting essentially of (a) unsaturated polyester resins, containing reactive carboxylic acid groups, of diols and ethylenically unsaturated dicarboxylic acids or the corresponding anhydrides (b) unsaturated polymerizable monomers having ethylenic unsaturation and at least one chemical thickening agent selected from the group of anhydrous salts consisting of calcium propionate, calcium salicylate, calcium benzoate, calcium laurate, barium acetate, zinc propionate and zinc salicylate, the amount of anhydrous salt being 10–100 mmole per hundred parts of resin.

2. The composition of claim 1 wherein the chemical thickening agent is calcium propionate.

References Cited

UNITED STATES PATENTS

| | | | |
|---|---|---|---|
| 2,308,498 | 1/1943 | Earhart et al. | 260—22U |
| 3,124,549 | 3/1964 | Salgado et al. | 260—40 |
| 3,219,604 | 11/1965 | Fischer | 260—22T |
| 3,390,205 | 6/1968 | Schnell et al. | 260—75T |
| 3,468,920 | 9/1969 | Larimer | 260—407 |

MORRIS LIEBMAN, Primary Examiner

H. H. FLETCHER, Assistant Examiner

U.S. Cl. X.R.

260—22, 40, 75, 865